United States Patent [19]

Nakamura

[11] Patent Number: 5,678,100
[45] Date of Patent: Oct. 14, 1997

[54] DOUSER MOUNTING STRUCTURE FOR A PHOTOGRAPHIC CAMERA HAVING A PANORAMIC PHOTOGRAPHING FUNCTION

[75] Inventor: Hiroshi Nakamura, Ohmiya, Japan

[73] Assignee: Fuji Photo Optical Co., Ltd., Saitama-Ken, Japan

[21] Appl. No.: 365,488

[22] Filed: Dec. 28, 1994

[30] Foreign Application Priority Data

Dec. 28, 1993 [JP] Japan .................... 5-351721

[51] Int. Cl.[6] .......................... G03B 37/00; G03B 17/02
[52] U.S. Cl. .................................. 396/435; 396/436
[58] Field of Search ................. 354/99, 159; 396/435, 396/436

[56] References Cited

U.S. PATENT DOCUMENTS

| | | |
|---|---|---|
| 5,083,146 | 1/1992 | Ueda . |
| 5,086,311 | 2/1992 | Naka et al. . |
| 5,255,030 | 10/1993 | Mukai et al. . |
| 5,258,790 | 11/1993 | Tanaka ................ 354/94 |
| 5,353,076 | 10/1994 | Goddard ............... 354/94 |
| 5,353,077 | 10/1994 | Tanaka et al. . |
| 5,398,088 | 3/1995 | Yamazaki et al. ........ 354/106 |
| 5,410,381 | 4/1995 | Kameyama et al. ....... 354/222 |
| 5,436,683 | 7/1995 | Ohshita et al. .......... 354/94 |

OTHER PUBLICATIONS

Co-pending United States patent application Serial No. 08/365,601, filed Dec. 27, 1994, entitled Switching Mechanism For A Photographic Camera Having A Panoramic Photographing Function.

Primary Examiner—Michael L. Gellner
Assistant Examiner—Daniel Chapik
Attorney, Agent, or Firm—Price, Heneveld, Cooper, DeWitt & Litton

[57] ABSTRACT

The present invention discloses a mounting structure for dousers allowing a photographic camera to be selectively operated in a PANORAMA MODE, characterized in that an aperture frame is provided separately of a camera body so as to be mounted on the camera body from behind and to pivotally carry the dousers. The structure, according to the invention, facilitates operation of mounting the dousers and, in addition, makes a telescopic lens barrel retractable into the camera body as deeply as possible. The dousers are pivotally supported by fork-shaped support means provided on the front side of the aperture frame so that the dousers may be pivotally moved toward or away from upper and lower zones of the aperture. The aperture frame is detachably mounted on the rear side of the camera body from behind so that output means of a drive mechanism for the dousers are operatively associated with the dousers as the aperture frame is thus mounted on the camera body. The aperture frame is formed on its rear side with a pair of rails arranged to face upper and lower edges of the aperture's rear side as the aperture frame is mounted on the camera body.

6 Claims, 6 Drawing Sheets

DOUSER MOUNTING STRUCTURE FOR A PHOTOGRAPHIC CAMERA HAVING A PANORAMIC PHOTOGRAPHING FUNCTION

BACKGROUND OF THE INVENTION

1. Field of the Invention

The present invention relates to a mounting structure for dousers in a photographic camera having a panoramic photographing function and selectively operated in a NORMAL MODE using a full-sized film frame or in a so-called PANORAMA MODE using a film frame in a size corresponding to a full-sized frame having its upper and lower zones covered by the respective dousers.

2. Description of the Art

An individual frame of 35 mm film will have a size of approximately 24 mm×36 mm when each frame of such film is used in its full size. Recently, a photographic camera having a panoramic photographing function has come into wide use, in which a picture of laterally long size corresponding to the full size but having its upper and lower zones unexposed. Such panoramic frame will have a size, for example, of approximately 16 mm×36 min. Such camera will provide a picture particularly useful to record objects such as scenery and a site of construction work when these objects are photographed in PANORAMA MODE using a wide-angle objective.

In such camera having a panoramic photographing function of the type known in the prior art, the dousers are often movably mounted in front of an aperture. Specifically, the dousers are pivotally movable away from the front of the aperture so as to open the aperture fully, and thereby to expose the film frame in NORMAL MODE, and are pivotally movable so as to cover upper and lower zones of the aperture and correspondingly to expose the film frame with the upper and lower zones covered by the respective dousers. Consequently, the NORMAL MODE provides a full-sized picture by exposing the film frame over the entire aperture and the PANORAMA MODE provides a so-called panoramic picture of laterally long size by exposing the film frame over its middle zone, with its upper and lower zones covered by the respective dousers.

In such camera having a panoramic photographing function of the type known in the prior art, the dousers are necessarily mounted on the camera body because the aperture is formed in the rear side of the camera body. Accordingly, the dousers are located in front of the aperture and the dousers will be assembled into the camera body from the front and mounted thereon so as to be associated with the upper and lower zones of the aperture. The dousers may be supported by upper and lower edges of the aperture in a manner that these dousers are pivotally movable around respective horizontal axes which are orthogonal to an optical axis of the objective.

However, with the conventional mounting structure for the dousers described above, the particular structure of the camera requires an inconveniently complicated operation for mounting of the dousers. In addition, the mounting structure for dousers becomes also complicated. More specifically, the presence of a lens barrel to hold the objective in front of the aperture makes it necessary for the lens barrel to be kept clear during assembly of the dousers into the camera body and correspondingly makes the mounting structure, as well as the mounting operation, undesirably complicated.

To facilitate the operation of assembling the dousers into the camera body from the front as effectively as possible, it is preferred to provide support means for the dousers extending forward by a sufficient length from the aperture frame so that the dousers may be supported by these support means adjacent their forward ends. However, the presence of these support means significantly extending forward necessarily limits the extent over which the lens barrel can extend or retract. As a consequence, with the camera having a telescoping lens barrel in which the lens barrel is adapted to extend or retract into the camera body along the optical axis, the forward end of the lens barrel remains partially extending forward even after the camera has been made unready for photographing. Any attempt to make such forward end coplanar with the front side of the camera will disadvantageously increase the depth of the camera.

SUMMARY OF THE INVENTION

In order to solve the problem mentioned above, it is a principal object of the invention to provide a mounting structure for dousers incorporated in a photographic camera provided with a panoramic photographing function in such a manner that the operation of mounting the dousers may be facilitated and the depth of the camera may be minimized even if the camera is of telescoping lens barrel type.

The object set forth above is achieved in a mounting structure for dousers allowing a photographic camera to be selectively operated in a NORMAL MODE, which provides a full-sized picture, or in PANORAMA MODE, which provides a picture of laterally long size taken with upper and lower zones of an aperture covered by the respective dousers. According to one aspect of the invention, an aperture frame defining the aperture is detachably mounted on a camera body from behind. Support means are provided on the front side of said aperture frame for pivotally supporting the dousers. The dousers are mounted on said aperture frame, which is then mounted on the camera body from behind.

According to another aspect of the invention, an aperture frame defining the aperture is detachably mounted on a camera body from behind. Support means are provided on the front side of said aperture frame for pivotally supporting the dousers. The dousers are mounted on said aperture frame, which is then mounted on the camera body from behind. A drive mechanism for the dousers is partially brought in operative association with parts of said dousers from the front, as the aperture frame is mounted together with the dousers carried by said aperture frame into the camera body. Such arrangement allows a driving operation for the dousers to be performed on the front side of the camera; although, the aperture frame is assembled into the camera body together with the dousers carried by said aperture frame from behind.

Preferably, the dousers are normally biased to be pivotally moved to their positions at which the camera is operated in the NORMAL MODE and thereby to be smoothly operated.

Preferably, the dousers are formed on one of their lateral sides with input wings, respectively, so that the drive mechanism for the dousers partially bears against the respective input wings and is, thereby, operatively associated with the dousers.

Preferably, the camera body is formed in its rear wall at positions corresponding to the respective input wings with through-holes so that the drive mechanism for the dousers may be partially brought in operative association with the respective input wings through the respective through-holes.

Preferably, there is provided on the front side of the camera a photographing mode changeover manipulator for providing a user input to the drive mechanism.

According to a more detailed aspect of the invention, the aperture frame assembled with said dousers is mounted on the camera body from behind. The aperture frame is fastened by means of setscrews or the like to the camera body from behind. In this way, the mounting operation is facilitated with respect to the case in which the dousers are mounted directly on the camera body. Additionally, the structure itself is simplified and a reliable light shielding is achieved in proximity of the lens barrel, since the lens barrel and the other components require no additional working for assembly of the dousers into the camera body.

The dousers are automatically brought into operative association with the output means of the drive mechanism for the dousers as the assembly of the aperture frame/dousers is mounted in the camera body and the photographing mode changeover manipulator, exposed on the outer side of the camera body, is operated to change over the photographing mode between a NORMAL MODE and a PANORAMA MODE via the drive mechanism.

DETAILED DESCRIPTION OF THE PREFERRED EMBODIMENTS

The mounting structure, according to the invention, for dousers allowing a photographic camera to be selectively operated in a PANORAMA MODE will be more fully understood from the following detailed description of preferred embodiments made in reference to the accompanying drawing.

Figure 6:
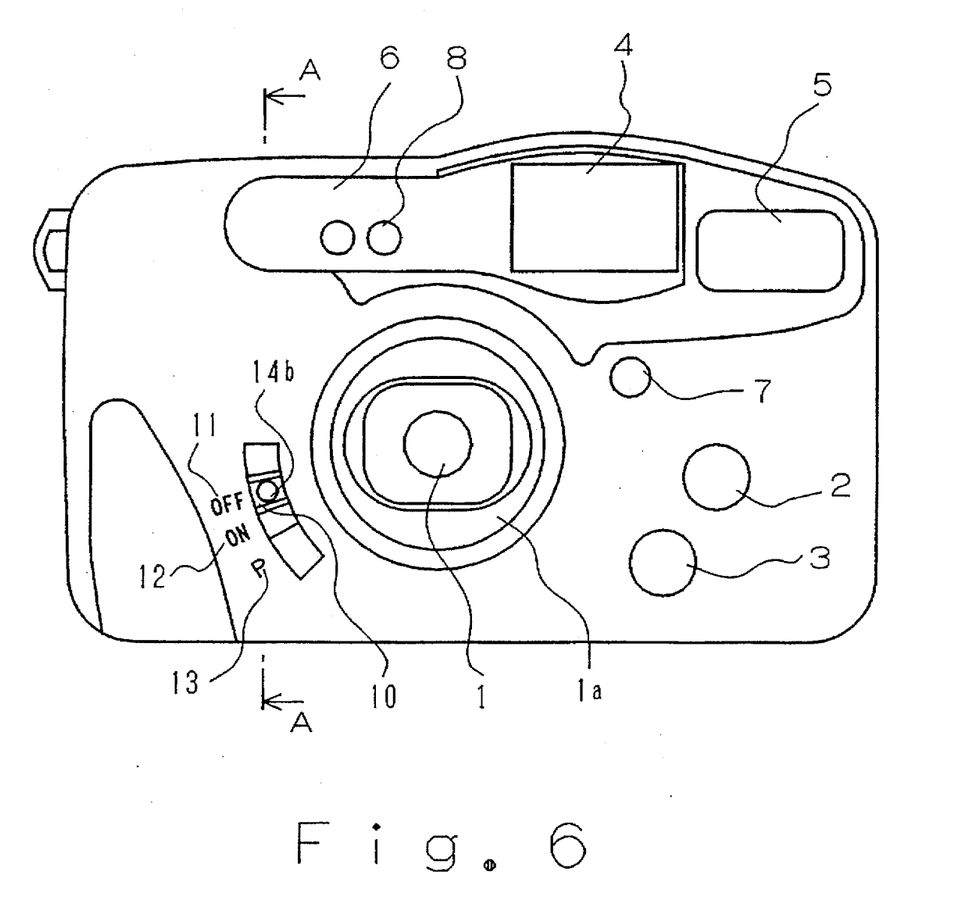
FIG. 6 is a schematic front view of the camera having a panoramic photographing function.

FIG. 6 is a front view of a photographic camera capable of being provided with the mounting structure of the invention and, as shown, the camera has adjacent to its center an objective 1 held by a lens barrel 1a. Off to the lower left of the objective 1, as viewed in FIG. 6, there is provided a changeover knob 10 that is slidably movable around an optical axis of the objective 1 along a circular arc. An end of the range over which the changeover knob 10 is slidably movable corresponds to an OFF index 11 of a main switch, a middle zone of the range corresponds to an index 12 indicating turn-ON of the main switch as well as a normal photographing mode, and the other end of the range corresponds to a panoramic photographing mode index 13.

The camera further includes zooming means adapted to move objective 1 back and forth along the optical axis thereof and thereby to change its focal distance, and a tele-photo switch 2 as well as a wide-angle switch 3 on the right side of said objective 1, both being used for zooming drive. Above the objective 1, the camera has a view-finder window 4 and a strobe-flash window 5 arranged side-by-side. On the side of view-finder window 4 remote from said strobe-flash window 5, the camera has a range-finder window 6 behind which there is provided a range-finding element (not shown) for automatic focussing. There is further provided on the right side of the objective 1 and above the array including said tele-photo switch 2 a display lamp 7 for timer-based photographing. Range-finder window 6 is centrally provided with a lamp 8 to alleviate a red-eye phenomenon associated with strobe-flashed photographing.

Figure 3:
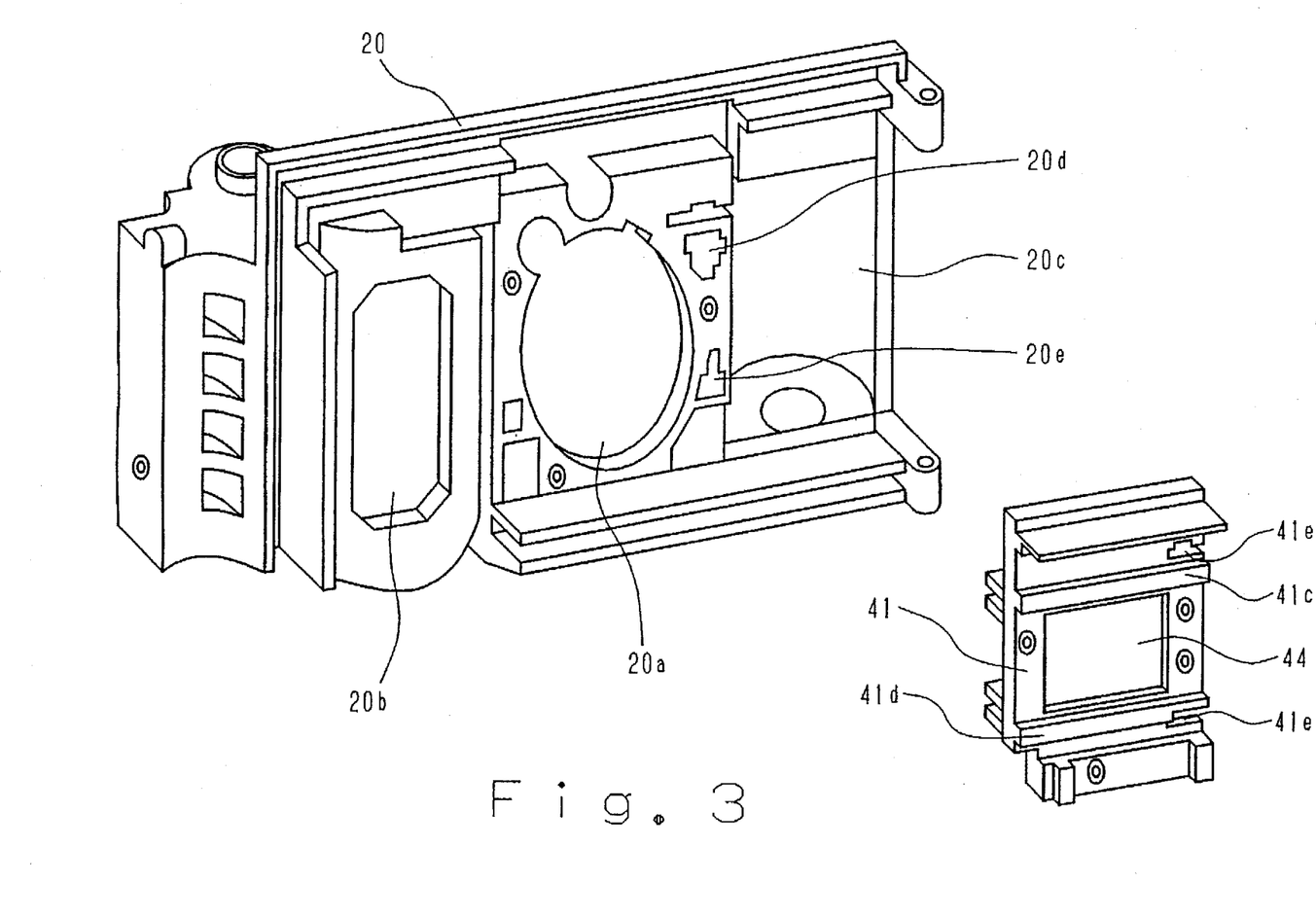
FIG. 3 is a schematic perspective view illustrating a manner in which the aperture frame is mounted on the rear side of a camera body.

FIG. 3 is an exploded perspective view showing a camera body 20 as viewed from behind. As shown, camera body 20 is centrally formed practically around the optical axis of the objective 1, a circular opening 20a, and provided at laterally opposite sides thereof with a patrone chamber 20b and a spool chamber 20c, respectively, with the opening 20a therebetween. An aperture frame 41 is secured by means of setscrews or the like to a peripheral edge surrounding said opening 20a. Aperture frame 41 is centrally formed with a substantially rectangular opening, which defines an aperture 44 having its center brought practically in coincidence with the center of opening 20a as the aperture frame 41 is mounted on camera body 20. The rear surface of aperture frame 41 is formed along upper and lower edges thereof with a pair of film rails 41c, 41d slightly projecting rearward from said rear surface and extending in parallel to each other with aperture 44 therebetween so that the film roll loaded in the camera may be transported back and forth along these rails 41c, 41d. The upper and lower edges of aperture 44 are formed with a pair of notches 41e, respectively, extending from respective one ends of these edges along portions thereof.

Figure 2:
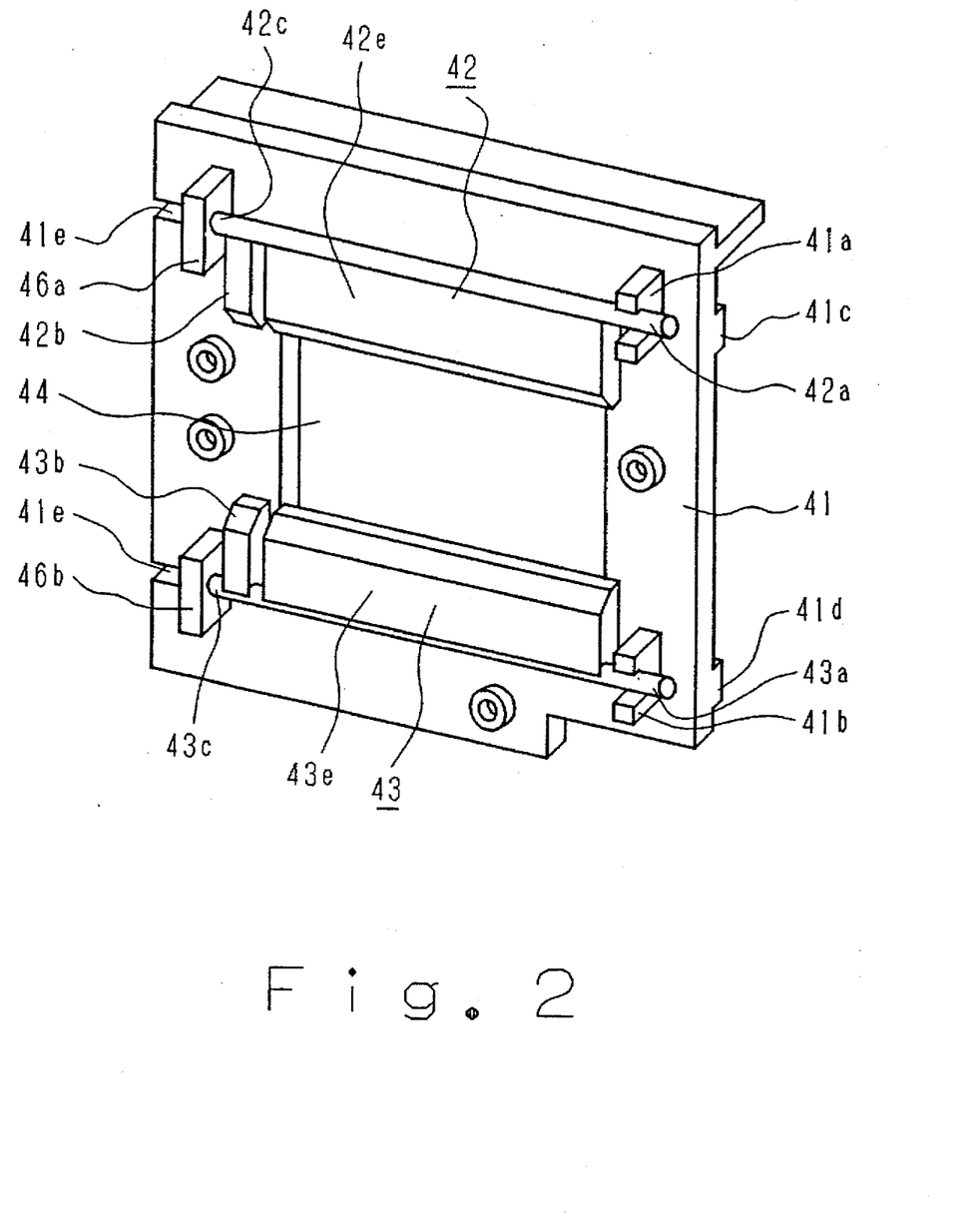
FIG. 2 is a schematic perspective view showing the front side of an aperture frame with dousers mounted thereon.

FIG. 2 is a schematic perspective view showing the front side of aperture frame 41 particularly as an upper douser 42 and a lower douser 43 have been mounted thereon. As shown, a pair of fork-shaped support means 41a, 41b are provided on the aperture frame 41 at one lateral side thereof adjacent upper and lower corners, more specifically, so as to lie on horizontal extensions of the respective notches 41e and to project forward slightly from the front surface of aperture frame 41.

Dousers 42, 43, respectively, comprise basic portions 42e, 43e in the form of flat plates and rod-like shafts integrally formed with the respective basic portions and extending along their one long side edges. One end of each shaft extends from the basic portion 42e or 43e laterally in one and the same direction to define shaft section 42a or 43a. Each basic portion 42e, 43e is interrupted along its length adjacent the other end of said shaft so as to define an input wing 42b or 43b and said other end laterally extends outward from said input wing 42b or 43b so as to define a shaft section 42c or 43c. The front side of aperture frame 41 is formed with beating plates 46a, 46b. Shaft sections 42c, 43c are held by these bearing plates 46a, 46b and shaft sections 42a, 43a are held by fork-shaped support means 41a, 41b so that dousers 42, 43 may be pivotally supported by aperture frame 41. Namely, bearing plate 46a and fork-shaped support means 41a lie substantially in a common horizontal plane while bearing plate 46b and fork-shaped support means 42b lie substantially in a common horizontal plane.

Aperture 44 defined by aperture frame 41 has its upper and lower zones covered or uncovered by the respective dousers 42, 43 as these dousers 42, 43 are pivotally moved.

Specifically, aperture 44 provides a frame which is longer from side-to-side when the aperture 44 has its upper and lower zones covered by dousers 42, 43 and, thus, a film frame defined just behind aperture 44 a this time is not exposed over its upper and lower zones corresponding to those of aperture 44 covered by the upper and lower dousers 42, 43. Such a state enables a panoramic picture to be taken. With dousers 42, 43 having been pivotally moved away from said upper and lower zones of the aperture 44, the latter is completely left open and, correspondingly, the film frame can be exposed over its entire area for a normal-sized picture.

As will be apparent from FIG. 3, there are provided an upper manipulating hole 20d and a lower manipulating hole 20e both extending through the through the camera body 20 laterally of said opening 20a of the camera body 20 so that said input wings 42b, 43b of the respective dousers 42, 43 may be located within these manipulating holes 20d, 20e as the aperture frame 41 is mounted on the camera body 20 from behind. The basic portions 42e, 43e of the respective dousers 42, 43 are adapted to be located within opening 20a in this state.

Figure 4:
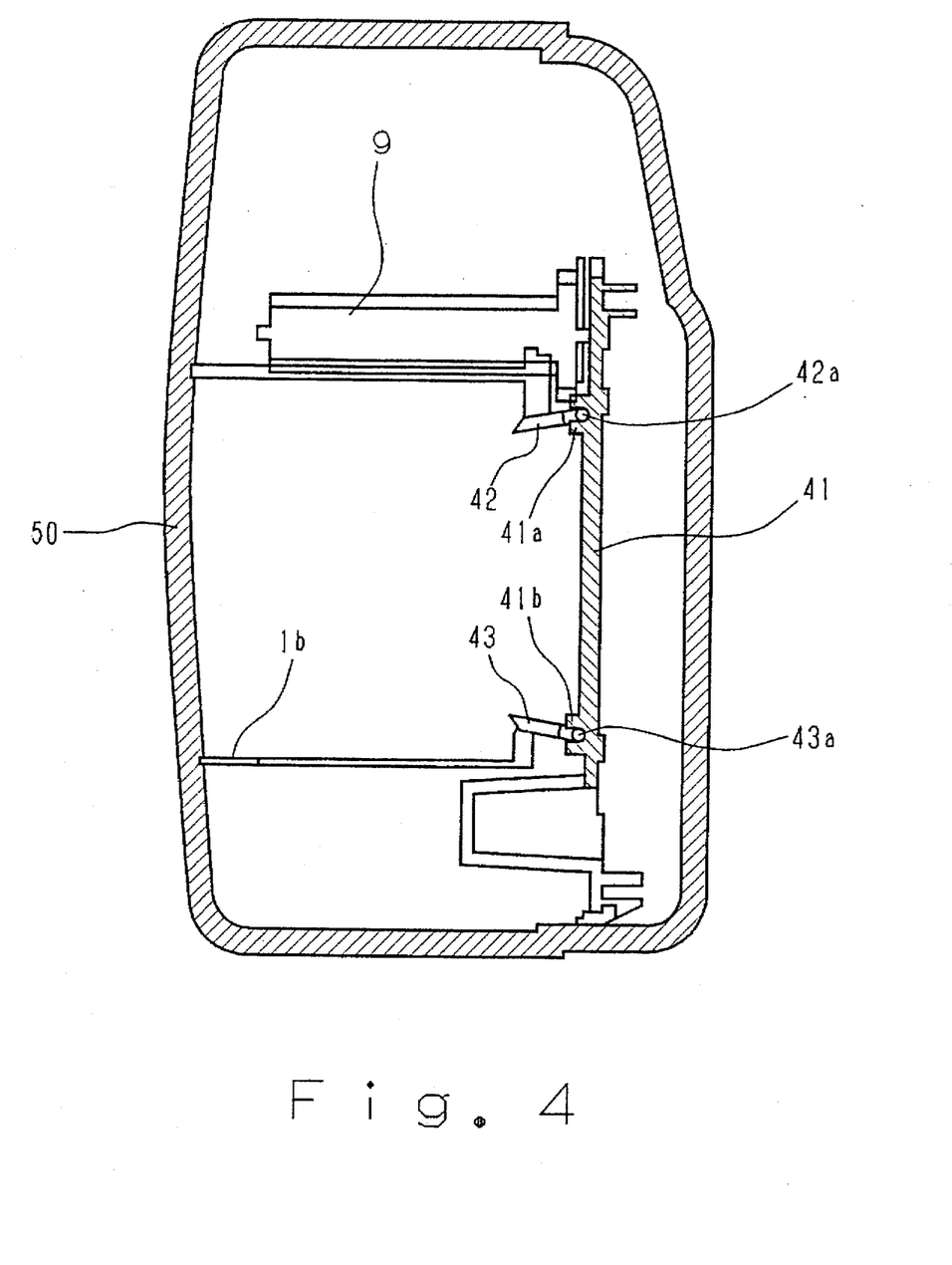
FIG. 4 is a sectional side view of the camera body having the aperture frame mounted thereon as taken along its vertical middle plane.

FIG. 4 is a schematic sectional view showing camera body 20 assembled with aperture frame 41. In the state shown, dousers 42, 43 have been pivotally moved away from aperture 44, allowing the camera to be operated in the NORMAL MODE. In front of aperture frame 41, there is provided a stationary lens barrel 1b within which lens barrel 1a is movable back and forth. Above this stationary lend barrel 1b, a lens barrel driving gear 9, extending in parallel to the optical axis, is rotatably supported so as to be rotatably driven by power supplied from a drive source (not shown). Lens barrel driving gear 9 is engaged with gear means (not shown) formed around the lens barrel 1a at an appropriate location so that lens barrel 1a is rotated and moved back or forth relative to the stationary lens barrel 1b as the lens barrel driving gear 9 is rotated.

Figure 1:
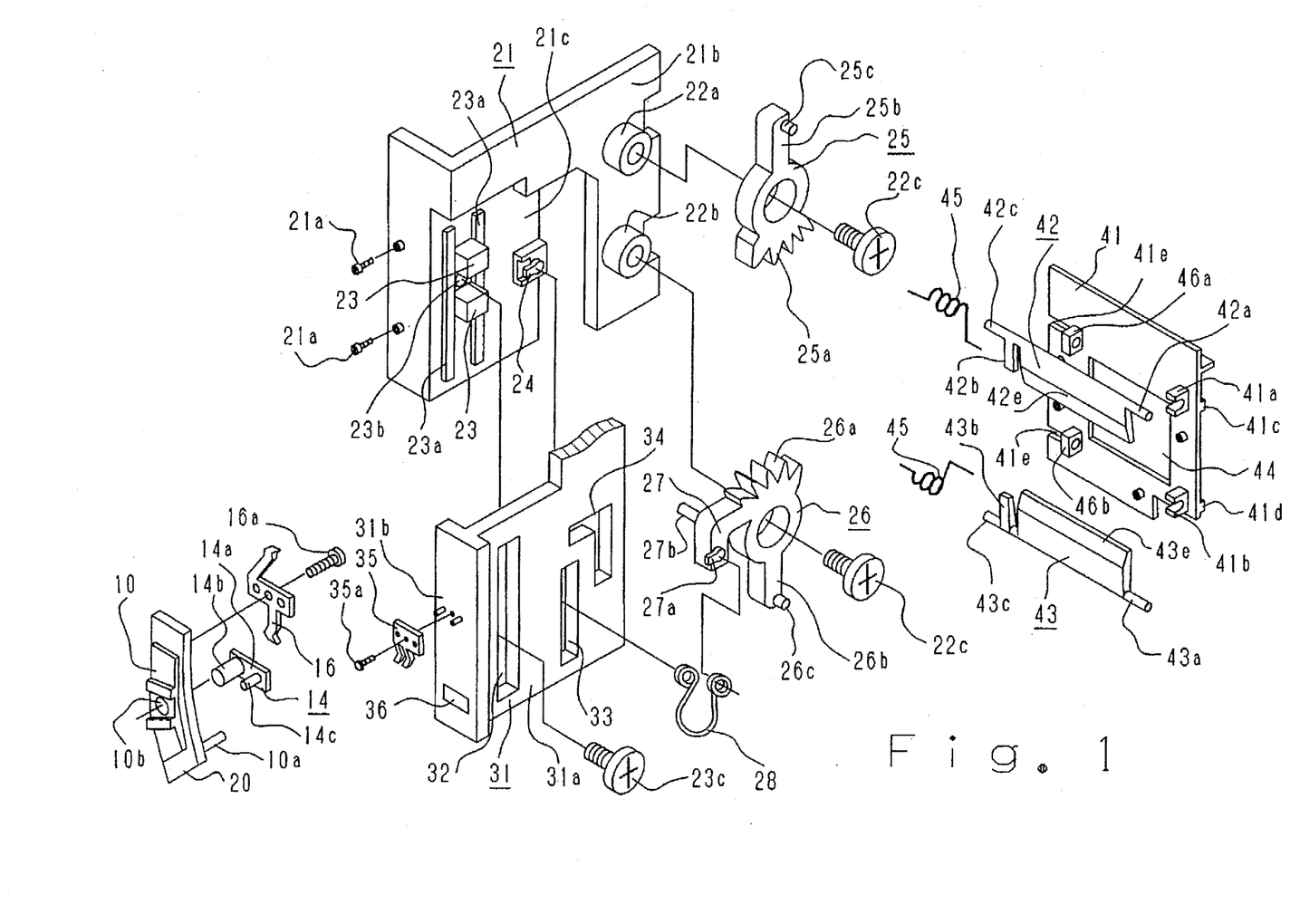
FIG. 1 is an exploded perspective view illustrating an arrangement of a photographing mode changeover mechanism.
Figure 5:
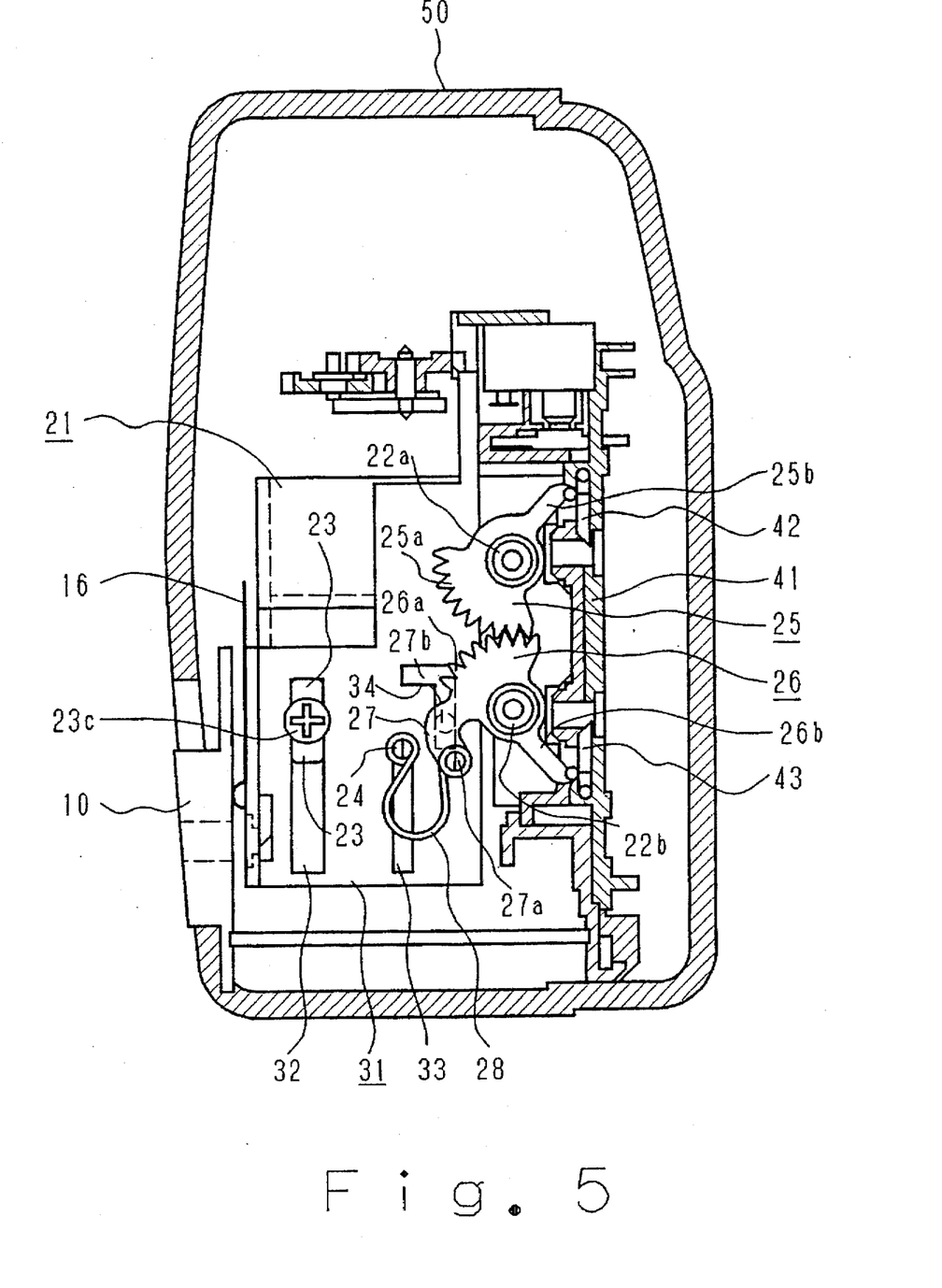
FIG. 5 is a sectional view as taken along a line A—A in FIG. 6, illustrating the photographing mode changeover mechanism operative to drive the dousers.

A drive mechanism for dousers 42, 43 will now be discussed. FIG. 5 is a sectional view of the camera as taken along a line A—A in FIG. 6, illustrating the drive mechanism for the dousers serving as the photographing mode changeover mechanism. FIG. 1 is a schematic exploded perspective view showing important parts of the changeover mechanism. Within a camera housing 50, a panoramic base plate 21 is fixed by setscrews 21a to a camera body 20. The panoramic base plate comprises a plate member bent to present a substantially L-shaped cross section, one arm of said L being bent again in an L shape away from its upper end to form a difference in level. An upper step surface 21b defined by such difference in level carries thereon a pair of support shafts 22a, 22b vertically spaced from each other by an appropriate distance. A lower step surface 21c, also defined by said difference in level, carries thereon a pair of vertically extending rails 23a and a pair of guide blocks 23 vertically spaced from each other between these rails 23a. Between a pair of guide blocks 23, the lower step surface is formed with a threaded hole 23b. Laterally of said rails 23a, the lower step surface 21c is provided with anchoring means 24 on which one end of a drive spring, as will be described later, is anchored.

A panoramic slide plate 31 is slidably supported on panoramic base plate 21. Panoramic slide plate 31 presents a substantially T-shaped cross section and a planar portion of panoramic slide plate 31 defining a leg 31a of said T shape is formed adjacent atop 31b of said T shape with a longitudinal guide hole 32, of which longer sides vertically extend, adjacent and in parallel to said guide hole 32 with an insertion hole 33 and adjacent to this insertion hole 33 with a substantially L-shaped limiting hole 34. Guide hole 32 of panoramic slide plate 31 is engaged on guide blocks 23 of panoramic base plate 21 so that panoramic slide plate 31 may be slidably supported on panoramic base plate 21. The panoramic slide plate 31 is provided on a front surface of the substantially T-shaped top 31b with a main switch contact 35 fixed thereto by setscrew 35a. Top 31b is formed in its lower portion with a rectangular drive hole 36 having longer sides extending in a substantially horizontal direction.

A keying pin 10a planted on the rear side of changeover knob 10 extends through a through-hole (not shown) of the camera housing 50 formed along the circular arc to guide the slidable movement of changeover knob 10 into said drive hole 36. Changeover knob 10 is centrally provided with a through-hole 10b into which a lock pin 14b of lock member 14 is inserted, as shown in FIGS. 3 and 4. Lock member 14 includes a base plate 14a. A lock pin 14b is planted on one end and a stopper pin 14c is planted on the other end of said base plate 14a. Stopper pin 14c is loosely inserted into a limiting groove 15 formed in the inner surface of the camera housing 50 and limiting groove 15 is formed in a range allowing changeover knob 10 to be slidably moved between the OFF index 11 and the ON (or NORMAL MODE) index 12 for the main switch. Accordingly, changeover knob 10 cannot be moved to the PANORAMA MODE index 13 so long as the stopper pin 14c lies in this limiting groove 15. Lock member 14 is normally biased under a restoring force of a pressure spring 16 comprising a leaf spring secured by a setscrew 16a on the inner surface of camera housing 50 so that stopper pin 14c cannot be easily disengaged from limiting groove 15. It should be understood that lock pin 14b will have its forward end projecting above the top surface of changeover knob 10, as seen in FIG. 4, as lock pin 14b is inserted into through-hole 10b of changeover knob 10.

On support shafts 22a, 22b of panoramic base plate 21, there are provided an upper douser driving plate 25 and a lower douser driving plate 26 which are rotatable therearound, respectively, but prevented by respective setscrews 22c from slipping off these support shafts 22a, 22b. These douser driving plates 25, 26 are formed with sector wheel 25a, 26a, respectively, and are adapted to be engaged with each other. Upper douser driving plate 25 has an upper driving arm 26b extending upwardly, i.e., in the direction opposite to said sector gear 25a with the rotational axis of the upper douser driving plate 25 therebetween. An upper driving pin 25c is planted on an upper end of upper driving arm 25b so as to extend in parallel to the rotational axis of upper douser driving plate 25.

Similarly, lower douser driving plate 26 has a lower driving arm 26b extending downwardly, i.e., in the direction opposite to said sector wheel 26a with the rotational axis of the lower douser driving plate 26 therebetween. A lower driving pin 26c is planted on a lower end of lower driving arm 26b so as to extend in parallel to the rotational axis of upper douser driving plate 26. One lateral end of sector wheel 26a extends substantially along an extension of the circular arc which defines sector wheel 26a to form an input arm 27 which carries an anchor 27a used to anchor one end of a driving spring 28. An input pin 27b is planted on input pin 27b at its middle point so as to extend toward panoramic base plate 21.

Guide blocks 23 and anchor 24 of the panoramic base plate 21 fixed to camera body 20 are inserted into guide hole 32 and insertion hole 33 of panoramic slide plate 31 as panoramic slide plate 31 is put on panoramic base plate 21. In this state, driving spring 28, comprising a toggle spring, is suspended between anchor 24 on panoramic base plate 21 and anchor 27a on lower douser driving plate 26. In the same state, the head of the setscrew 23c threaded into said threaded hole 23b, as seen in FIG. 2, prevents panoramic slide plate 31 from slipping off panoramic base plate 21.

In the rear portion of the camera body 20, there is stationarily provided an aperture frame 41 in front of which an upper douser 42 and a lower douser 43 are supported rotatably around respective axes extending horizontally and being orthogonal to the optical axis. It should be understood that the shafts 42e, 43c of the respective dousers 42, 43 are loaded with return springs 45 each comprising a torsion coil spring so that dousers 42, 43 are biased under restoring force of return springs 45 to be pivotally moved from their panoramic positions back to their normal positions, respectively.

When panoramic base plate 21, panoramic slide plate 31, aperture frame 41, and dousers 42, 43 having been assembled together with camera body 20 into camera housing 50, driving pins 25c, 26c planted on driving arms 26b, 26b of respective douser driving plates 25, 26, which are pivotally supported by the panoramic base plate 21, bear against input wings 42b, 43b of the respective dousers 42, 43. In this state, changeover knob 10 is exposed on the front side of the camera.

Now it will be described how the mounting structure for the dousers according to the invention operates in a camera having the panoramic photographing function.

Shaft sections 42c, 43c of respective dousers 42, 43 may be held by bearing plates 46a, 46b of aperture frame 41 while the other shaft sections 42a, 43a of said dousers may be held by fork-shaped support means 41a, 41b of aperture frame 41 to mount dousers 42, 43 on the upper and lower zones of aperture frame 41 on its front side. Aperture frame 41 assembled in this manner with dousers 42, 43 may be then mounted on the rear side of camera body 20 from behind, as shown in FIG. 3. The dousers may be secured to the aperture frame by means of setscrew or adhesive. Input wings 42b, 43b of the respective dousers 42, 43 are automatically located within manipulating holes 20d, 20e of camera body 20 as aperture frame 41 is mounted on camera body 20. Similarly, drive pin s 25c, 26c of the respective douser driving plates 25, 26 bear against input wings 42b, 43b, respectively, as the drive mechanism for dousers 42, 43 is assembled into camera body 20.

To make the camera ready for photographing, changeover knob 10 provided on the front side of the camera is slidably moved from its position of main switch OFF-index 11 to its position of NORMAL MODE index 12. Behind the changeover knob 10, the lock member 14 is biased by the pressure spring so that stopper pin 14c of lock member 14 is loosely inserted into the limiting groove 15 formed in the inner side of the camera housing 50. Limiting groove 15 allows stopper pin 14c to be slidably moved only between the positions of OFF index and NORMAL MODE index 12 of the changeover knob 10. Thus, there is no possibility that stopper pin 14c might be unintentionally moved beyond the position of NORMAL MODE index 12 to the position of PANORAMA MODE index 13 unless lock pin 14, projecting from the changeover knob 10, is operated to move changeover knob 10 towards the position of NORMAL MODE index 12. When changeover knob 10 has been moved to the position of NORMAL MODE index 12, the main switch contact 35 is turned ON, and thereby the camera is made ready for photographing.

To switch the photographing mode from NORMAL MODE to PANORAMA MODE, the changeover knob 10 is moved from the position of NORMAL MODE index 12 to the position of PANORAMA MODE index 13 with lock pin 14b being depressed. Depression of the lock pin 14b allows the base plate 14a of lock member 14 to be disengaged from the rear side of the camera housing 50 against a restoring force of the pressure spring 16 and, thereby, allows stopper pin 14c to leave limiting groove 15. As a result, changeover knob 10 can be moved to the position of PANORAMA MODE index 13 and stopper pin 41c will rub the rear side of the camera housing during this movement of the changeover knob 10.

Once changeover knob 10 has reached the position of PANORAMA MODE index 13, panoramic slide plate 31 is pushed upwards with respect to panoramic base plate 21 because keying pin 10a has been inserted into driving hole 36 of panoramic slide plate 31. At the same time, input pin 27b is pushed by the upper end of the limiting hole 34 because input pin 27b of the lower douser driving plate 26 has been inserted into limiting hole 34 of panoramic slide plate 31. Thus, the lower rouser driving plate 26 will be pivotally moved around support shaft 22b counterclockwise as viewed in FIG. 3. Having reached an appropriate position, the lower douser driving plate 26 can be more smoothly rotated under a restoring force generated by the toggle function of driving spring 28.

Upper douser driving plate 25 is pivotally moved around support shaft 22b clockwise as viewed in FIG. 3 as lower douser driving plate 26 is pivotally moved, because sector wheel 25a of upper douser driving plate 25 is an engagement with sector wheel 26a of lower douser driving plate 26. Driving pins 25c, 26c planted on driving arms 26b, 26b of douser driving plates 25, 26 bear against input wings 42b, 43b of the respective dousers 42, 43 and thereby push dousers 42, 43, respectively. Consequently, upper douser 42 is pivotally moved counterclockwise against the restoring force of return spring 45 to the upper zone of the aperture 44 and lower douser 43 is pivotally moved clockwise to the lower zone of aperture 44, as viewed in FIG. 3. In this way, the upper and lower zones of the aperture 44 are covered by the respective dousers 42, 43 and the film frame is exposed, except for the upper and lower zones, to provide a panoramic-sized picture.

Should the dousers 42, 43 be forcibly moved from their PANORAMA MODE positions back to their NORMAL MODE positions when the camera is accidentally shocked or its rear cover is carelessly opened thereby pushing dousers 42, 43 directly inward, none of the apparatus' for driving the respective dousers 42, 43 will be subjected to a force sufficiently high to damage any component of these driving means because stopper pin 14c of the changeover knob 10 rubs the rear side of the camera housing 50 as changeover knob 10 is pushed upwards in operative association with the panoramic slide plate 31, which is pushed upwards by the lower douser driving plate 26, which is pivotally moved clockwise, as viewed in FIG. 3, due to said forcible movement of the respective dousers 42, 43.

To switch the photographing mode from PANORAMA to NORMAL, changeover knob 10 is moved from the position of PANORAMA MODE index 13 to the position of NORMAL MODE index 12. Such movement of changeover knob 10 causes panoramic slide plate 31 to be pushed upwards, thereby the effect of limiting hole 34 on the input pin 27b is removed and the lower douser driving plate 26 is free to move. Consequently, lower douser 43 is made free from the effect of lower douser driving plate 26 and lower douser 43 is pivotally moved counterclockwise, as viewed in FIG. 3, under a restoring force of return spring 45. Such pivotal movement of lower douser 43 causes lower douser driving plate 26 to be rotated around support shaft 22b clockwise, as viewed in FIG. 3. Engagement of sector wheel 25a with sector wheel 26a causes upper douser driving plate 25 to be rotated around support shaft 22a counterclockwise, as viewed in FIG. 3. This rotation of upper douser driving plate 25 makes upper douser 42 free and, in consequence, upper douser 42 is rotated clockwise, as viewed in FIG. 3, under the restoring force of the return spring 45. In this manner, dousers 42, 43 are retracted from the upper and lower zones of the aperture 44, allowing the film frame to be exposed in normal size over the entire aperture 44.

Having reached an appropriate position, lower douser driving plate 26 is biased to be pivotally moved clockwise under a restoring force owing to the toggle function of driving spring 28. When changeover knob 10 is slidably moved to the position of NORMAL MODE index 12, stopper pin 14c of lock member 14 is inserted by a restoring force of pressure spring 16 into limiting groove 15, so that changeover knob 10 cannot be moved to the position of PANORAMA MODE index 13 unless lock pin 14b is depressed.

Changeover knob 10 may be moved to the position of the main switch OFF index 11 to turn the main switch contact 35 off and, thereby, the camera is made unready for photographing.

As will be appreciated form the foregoing description, the mounting structure for the dousers according to the invention, serving to provide a photographic camera with a panoramic photographing function, allows the mounting operation for the dousers to be facilitated, because the dousers may be mounted on the aperture frame provided separately of the camera body and this aperture frame carrying the dousers may be assembled into the camera body from behind. Additionally, the invention simplifies the structure itself because the aperture frame is designed to be assembled into the camera body from behind. Therefore, the lens barrel and the other components require no additional working for assembly of the dousers into the camera body.

Furthermore, in view of the fact that the aperture frame carrying the dousers is designed to be assembled into the camera body from behind, the support means for the dousers can be provided at locations in the camera body which are deeper than in the case that the dousers must be assembled into the camera body from the front. With a camera having a telescoping lens barrel, the lens barrel will be retractable to a correspondingly deeper position in the camera body allowing a thin and/or compact camera to be realized.

The embodiments of the invention in which an exclusive property or privilege is claimed are defined as follows:

1. A structure for mounting dousers on the body of a photographic camera selectively operated in a NORMAL MODE which provides a full-sized picture or in a PANORAMA MODE which provides a picture of laterally long size taken with upper and lower zones of an aperture covered by respective dousers, comprising:

an aperture frame defining the aperture of the camera, said frame being detachably mounted on the camera body from behind;

support means provided on the front side of said aperture frame for pivotally supporting said dousers, wherein said dousers are mounted on said aperture frame which is mounted on the camera body from behind;

a drive mechanism for said dousers which is partially brought into operative association with said dousers from the front of said camera body as said aperture frame is mounted together with said dousers on the camera body from behind; and a photographic mode changeover manipulator assembly extending from the front side of the body of the camera and engaging said drive mechanism for said dousers for manipulating said dousers between the NORMAL and PANORAMA MODES.

2. The structure for mounting dousers according to claim 1, wherein said dousers are normally biased to be pivotally moved toward their positions at which the camera is operated in the NORMAL MODE.

3. The structure for mounting dousers according to claim 1, including input wings formed, respectively, on lateral sides of said dousers so that the drive mechanism for the dousers partially bears against said input wings and is thereby operatively associated with the dousers.

4. The structure for mounting dousers according to claim 3, wherein the camera body is formed in its rear wall at a position corresponding to said input wings with through-holes so that the drive mechanism for the dousers is partially brought in operative association with said input wings through said through-holes.

5. The structure for mounting dousers according to claim 2, including input wings formed, respectively, on lateral sides of said dousers so that the drive mechanism for the dousers partially bears against said input wings and is thereby operatively associated with the dousers.

6. The structure for mounting dousers according to claim 5, wherein the camera body is formed in its rear wall at a position corresponding to said input wings with through-holes so that the drive mechanism for the dousers is partially brought in operative association with said input wings through said through-holes.

* * * * *

UNITED STATES PATENT AND TRADEMARK OFFICE
CERTIFICATE OF CORRECTION

PATENT NO. : 5,678,100
DATED : October 14, 1997
INVENTOR(S) : Nakamura

It is certified that error appears in the above-identified patent and that said Letters Patent is hereby corrected as shown below:

Column 1, line 25;
    "36 min." should be --36 mm--.

Column 3, line 58;
    "are" should be --arc--.

Column 4, line 57;
    "beating" should be --bearing--.

Column 5, line 15;
    Delete "through the" (second occurrence).

Column 5, line 29;
    "lend" should be --lens--.

Column 6, line 24;
    "0N" should be --ON--.

Column 6, line 44;
    "26b" should be --25b--.

Column 7, line 11;
    "42e" should be --42c--.

Column 7, line 20;
    "26b" should be --25b--.

UNITED STATES PATENT AND TRADEMARK OFFICE
CERTIFICATE OF CORRECTION

PATENT NO. : 5,678,100
DATED : October 14, 1997
INVENTOR(S) : Nakamura

It is certified that error appears in the above-identified patent and that said Letters Patent is hereby corrected as shown below:

Column 8, line 9;
    "41c" should be --14c--.

Column 8, line 20;
    "rouser" should be --douser--.

Column 8, line 31;
    "26b, 26b" should be --25b, 26b--.

Signed and Sealed this

Twelfth Day of May, 1998

Attest:

BRUCE LEHMAN

Attesting Officer            Commissioner of Patents and Trademarks